(12) United States Patent
Fitzpatrick et al.

(10) Patent No.: US 7,698,445 B2
(45) Date of Patent: Apr. 13, 2010

(54) CLIENT AGENTS FOR OBTAINING ATTRIBUTES FROM UNAVAILABLE CLIENTS

(75) Inventors: Mark Fitzpatrick, San Mateo, CA (US); Anthony Siress, Mountain View, CA (US)

(73) Assignee: YOUnite, Inc., Mountain View, CA (US)

( * ) Notice: Subject to any disclaimer, the term of this patent is extended or adjusted under 35 U.S.C. 154(b) by 344 days.

(21) Appl. No.: 11/734,664

(22) Filed: Apr. 12, 2007

(65) Prior Publication Data

US 2008/0256249 A1 Oct. 16, 2008

(51) Int. Cl.
*G06F 15/16* (2006.01)
(52) U.S. Cl. .......................................... 709/229; 707/10
(58) Field of Classification Search ......... 709/200–203, 709/217–229; 707/9, 10, 102
See application file for complete search history.

(56) References Cited

U.S. PATENT DOCUMENTS

| | | | |
|---|---|---|---|
| 6,269,369 B1 | 7/2001 | Robertson | |
| 6,754,665 B1* | 6/2004 | Futagami et al. | 707/102 |
| 7,139,555 B2 | 11/2006 | Apfel | |
| 7,316,013 B2 | 1/2008 | Kawano et al. | |
| 2003/0069874 A1* | 4/2003 | Hertzog et al. | 707/1 |
| 2004/0254810 A1* | 12/2004 | Yamaga et al. | 705/1 |
| 2005/0028012 A1* | 2/2005 | Amamiya et al. | 713/201 |
| 2005/0120084 A1 | 6/2005 | Hu et al. | |
| 2005/0154915 A1 | 7/2005 | Peterson et al. | |
| 2005/0234864 A1* | 10/2005 | Shapiro | 707/1 |
| 2007/0027953 A1 | 2/2007 | Wu | |

\* cited by examiner

*Primary Examiner*—Moustafa M Meky
(74) *Attorney, Agent, or Firm*—Perkins Coie LLP

(57) ABSTRACT

A computer system and methods for creating an agency relationship among clients of a computer system with respect to personal privileged, or otherwise sensitive permissions and/or attributes, is described. The system and methods allow a querying client to obtain permission and/or attributes from a queried client, even if the queried client is unavailable.

13 Claims, 3 Drawing Sheets

CLIENT AGENTS FOR OBTAINING ATTRIBUTES FROM UNAVAILABLE CLIENTS

BACKGROUND

Access to data stores or computer-readable mediums is often governed or regulated by permissions. Permissions expressly or impliedly indicate which users may access a data store, and to what extent. Permissions often impliedly or indirectly indicate a user's permitted access by referring to a permissions group of which the user is a member. A permissions group typically includes a set of member data store users with a common degree or level of permitted access; an association with a data store, set of data stores, or part of a data store; and a definition of the common degree or level of permitted access. Permissions often indicate the degree or level of access to an associated data store, set of data stores, or part of a data store with a set of modifiable variables, a set of preset parameters, a reference to a set of modifiable variables, or a reference to a set of preset parameters specifying whether the data entries in the associated storage may be viewed, modified, deleted, or created.

The existing systems address permissions and attributes stored on a server, and accessible to a querying client when the server is online and permissions are satisfied. However, some or all permissions and attributes may be stored on a client's local storage medium, such as hard drive in a workstation, or memory in a cell-phone or PDA, where they are inaccessible when the client is unavailable.

The present computer system and methods address these and other needs.

SUMMARY

A technique for providing attributes to a client with permission to access those attributes involves receiving a request, and querying an agent for the attributes. A system built according to the technique may include a first client capable of requesting one or more attributes associated with an unavailable second client; one or more client agents storing at least one of the one or more attributes of the second client; a server for receiving the first client's request, the server having a permissions database for storing a data entry specifying attribute-sharing permissions between the first client and the second unavailable client; wherein, in operation, the server forwards the request to the one or more agent clients for the one or more attributes associated with the second client.

A method according to the technique may include receiving a query from a first client for one or more attributes associated with a second client; if the first client has permission to access at least one of the one or more attributes associated with the second client, querying an agent client storing data associated with the at least one of the one or more attributes; replying with the at least one of the one or more attributes from the agent client.

This summary is provided by way of example, but not limitation. It is intended to give a brief overview of some aspects and embodiments of the invention, but further examples and embodiments are described below.

DETAILED DESCRIPTION

A computer system and methods are described for allowing a first client (e.g., a querying client) to obtain one or more attributes, i.e., personal, privileged, or otherwise sensitive information, associated with a second client (e.g., a queried client) via client agents, where the clients are connected at some point to a server, which grants permissions as specified, at least in part, by the second (queried) client. The computer system and methods are particularly useful for allowing clients to request attributes from an unavailable second client.

The computer system and methods are described below, with reference to the accompanying Figures (FIGs.), which are intended to illustrate, rather than limit, the system and methods. The terms "clients" and "subscribers" are used interchangeably, unless noted. A "first" client generally denotes a querying client, e.g., a system subscriber requesting attributes from a queried subscriber. A "second" client generally denotes a queried client, from which an attribute is sought.

I. Server System and Clients/Subscribers

Figure 1:
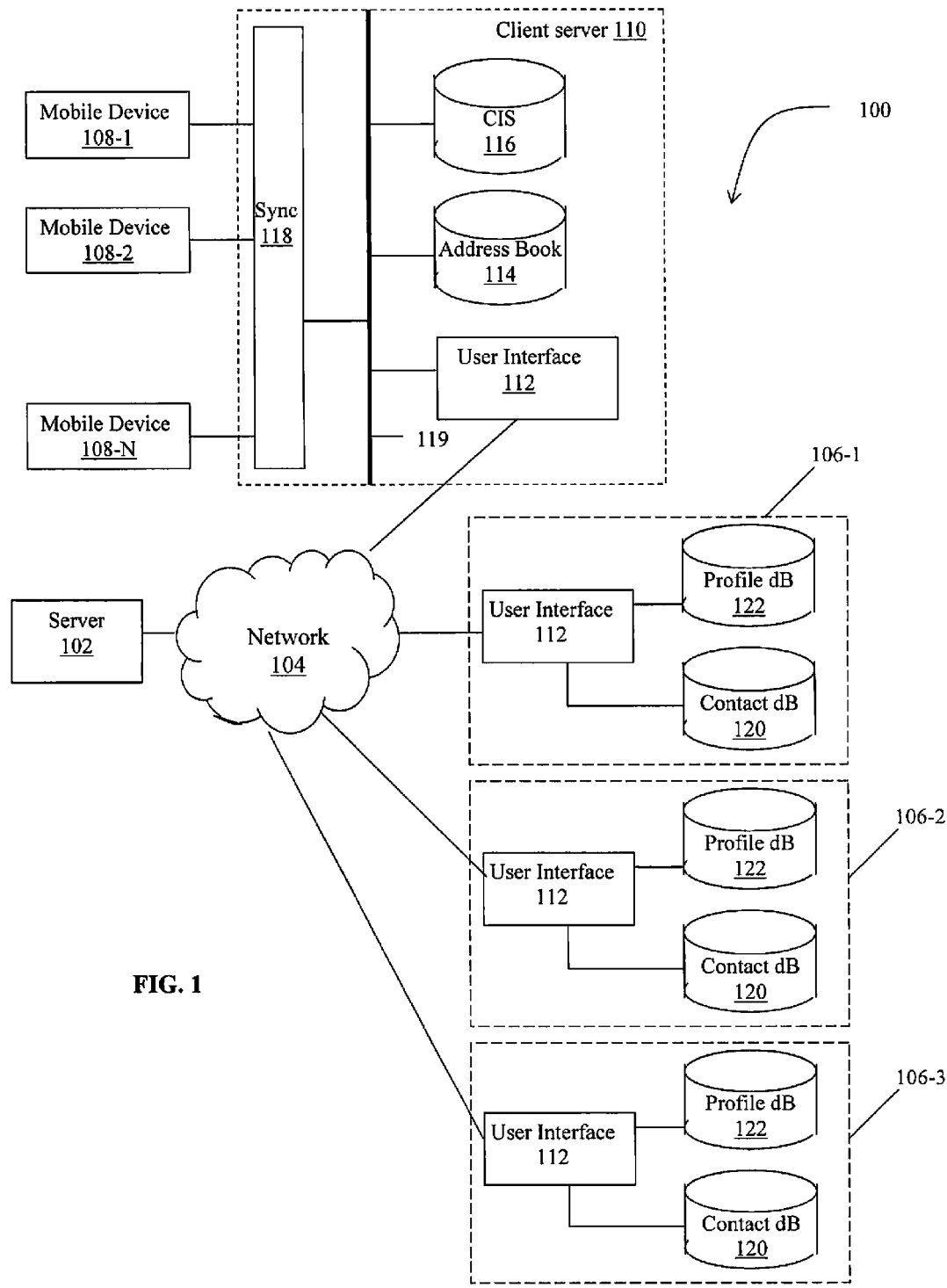
FIG. 1 depicts a conceptual view of a system in which the present system and methods function. Elements of the system are indicated. Arrows indicate the flow of information between the elements.

FIG. 1 depicts a conceptual view of an exemplary system in which the present system and methods may be applied. The system 100 includes a server 102, a network 104, clients 106-1, 106-2, 106-3 (referred to collectively as clients 106), mobile devices 108-1, 108-2, 108-N (referred to collectively as mobile devices 108), and a client server 110 (described, below).

It will be noted that the client server 110 is distinguished from the clients 106 for illustrative purposes only. Further, elements of the client 110 serve as illustrative embodiments of elements shown in clients 106. For example, the address book 114 serves as an example of a contact database 118 and may be implemented as a proprietary database such as a Yahoo® e-mail address book or an internal contact list customized for the system 100. Similarly, the CIS 116 may or may not be an exemplary embodiment of the profile database 122 and may comprise, among other things, attributes associated with a subscriber and/or permission settings. In other embodiments, an address book and/or a CIS are optional or left unpopulated.

Figure 2:
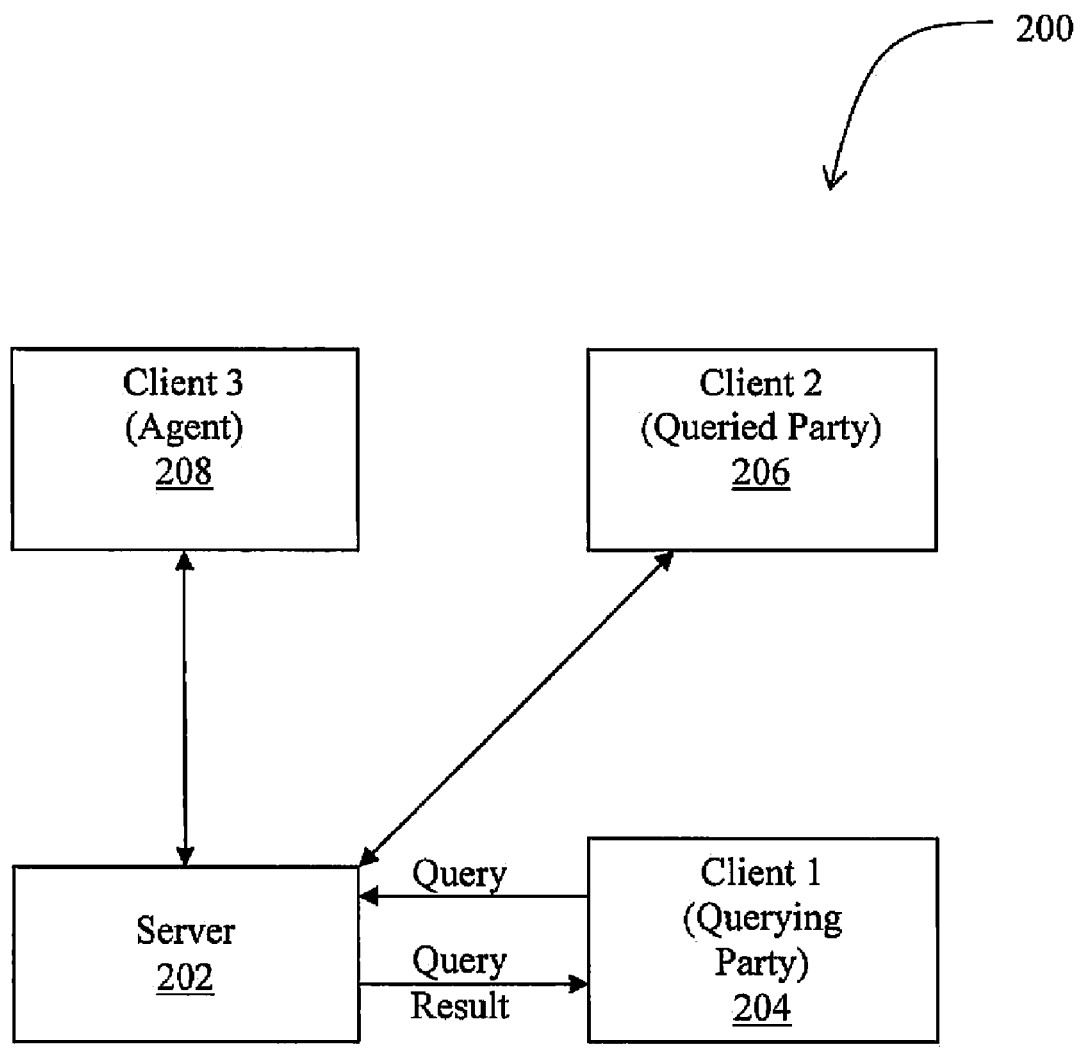
FIG. 2 depicts a system that provides permissions for query access control based on attributes. Elements of the system are indicated. Arrows indicate the flow of information between the elements.

FIG. 2 depicts a system 200 that provides permissions for query access control based on attributes. The system 200 may be similar to the system 100 depicted in FIG. 1. The system 200 gives a queried subscriber discretionary control over attributes data via permissions. The system 200 includes a server 202, a first or querying client (party) 204, a second or queried client (party) 206, and one or more client agent 208.

In an illustrative embodiment, the queried client has attribute data on local or mobile storage mediums that is not maintained on the server. Other clients may require such attribute data when the queried client is logged-off, shutdown, or otherwise unavailable. When a first or querying client 204 contacts a server requesting attributes from a second unavailable queried client 206, the request if forwarded to the one or more client agents 208 to obtain the attribute.

The server 202 may comprise one or more servers, in any applicable known or convenient arrangement. In an illustrative embodiment, the server 202 maintains permissions for all of the clients. While the server 202 may store attributes temporarily (or as part of a forwarding process to a querying client), the attributes may be primarily stored in a distributed fashion on the clients so as to, for example, free up resources on the server 202 or avoid centrally stored data. Alternatively, one or more client agents 208 stores permissions and/or attributes of the queried client 206. Thus, in various embodiments, permissions for access to the attribute may be on the server 202, client agent 208, or variations thereof.

Figure 3:
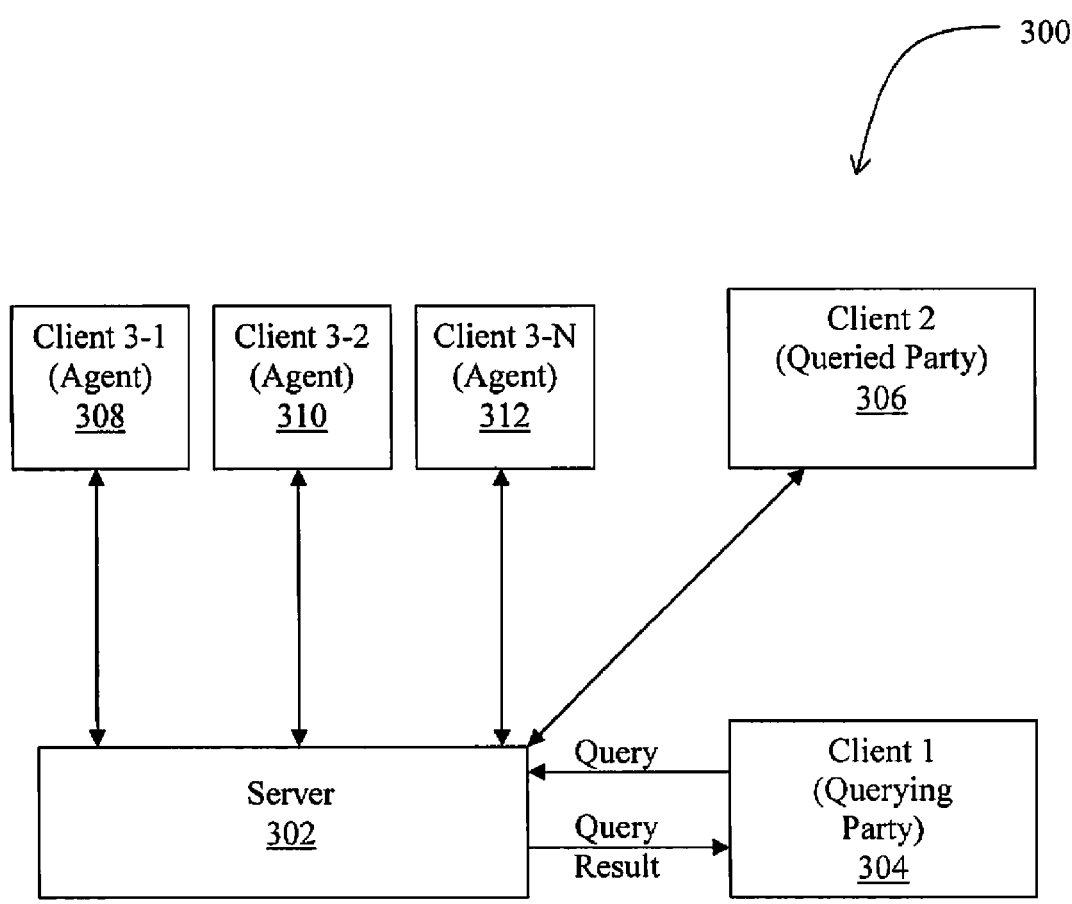
FIG. 3 depicts an embodiment in which there are several client agents in contact with a server. Elements of the system are indicated. Arrows indicate the flow of information between the elements.

FIG. 3 depicts an embodiment of the system 300 in which there are several client agents 308, 310, 312 in contact with a server 302, which is additionally in contact with a querying client 304 and a queried client 306. Where a querying client 304 requests an attribute from a queried client 306 via a server, and the queried client 306 is unavailable, the server forwards the request to one or more client agents 308, 310, 312. The client agents may be contacted simultaneously, or in an order specified by the queried client's 306 permissions and attributes, in an order specified by the server 302, or some other order. For example, where the queried client's computer is logged-off or turned off, the server contacts (i.e., forwards the request to) a first client agent 3-1 308, and then client agent 3-2 310, and then client agent 3-N 312, until an available client agent is found. The server 302 may obtain permissions and/or attributes from any of the client agents 308, 310, 312, allowing the querying client 304 who satisfies permissions to obtain attributes from a queried client 306, even when unavailable.

II. Client Agent

A client agent is a client that serves as an agent for a queried (or second) client. In this manner, an agency relationship may be established between or among a plurality of clients using a server system, such as the system illustrated in FIG. 1. A client agent may or may not store permissions and/or attributes of a particular queried client and respond to forwarded requests for attributes of the queried client when the queried client is unavailable. A client agent may store attributes and permissions, only attributes, only permissions, attributes and permissions from any number of different clients, encrypted or fragmented attributes and/or permissions, or any combination, thereof. The client agent may have access to the attributes and/or permissions, limited access to data in the attributes and/or permissions, or no access. In many embodiments, the agency relationship is essentially invisible to the client agent. Moreover, the client agent may be no different from any other client in the system (i.e., every client could potentially be a client agent, depending upon the embodiment, implementation, and/or client capabilities).

In some embodiments, attributes associated with a queried client are stored on one or more client agent, while permissions are stored on the server. In some embodiments, attributes and permissions are stored on client agents and implemented by the server. In some embodiments, attributes are stored on client agents and permissions are stored on client agents and the server, implemented by the server. In one embodiment, only permissions may be stored on a client agent, while the attributes are securely stored in a server or computer in communication with the server. Permissions from the queried client or corresponding client agents are required to access these attribute data. Other arrangement will be apparent to one skilled in the art.

In many embodiments, attributes and permissions may be stored in encrypted, fragmented, password or token protected, or other form to prevent client agents and other unauthorized clients from accessing the contents of stored attributes and/or permissions.

One or more client agents may be associated with any one or more clients. For example, each client may store (or host) permissions and/or attributes from a plurality of other clients on a server system. Alternatively or in addition, a particular client's permissions and/or attributes are hosted by a plurality of other clients. Permissions and/or attributes can be grouped, divided, or separated by any distinguishing feature and hosted on different clients to maintain separation.

In an exemplary operation referring to FIG. 3, when a "querying" or "first" client 304 contacts the server 302 requesting attributes of the queried client 306, permissions and/or attributes can be provided by one or more client agents, e.g., 308. This arrangement is of particular value when the queried client 306 is unavailable, such as off-line with respect to the server 302, shut-down, logged off, unplugged, crashed, or otherwise unable to communicate permissions and/or attributes with the server 302.

In this manner, a querying client 304 contacts the server 302, which first attempts to contact the queried client 306, and if unavailable, then contacts the client agent, e.g., 308, for permissions and attributes. If the querying client 304 has permission, the attributes are provided from the client agent, e.g., 308, or from another client agent, e.g., 310, 312. In this manner, personal, privileged, or otherwise sensitive permissions and attributes are made available to querying clients, while being isolated from the server.

III. Permissions and Attributes

Permissions include data entries specifying attribute-sharing permissions between or among different clients of a server system. Permissions may be in a permissions database for storing data entries specifying attribute-sharing permissions between clients. The database may be on a server, on a client or client agents, or a combination thereof.

In an illustrative embodiment, attributes are stored on a client agent, while permissions are stored on the server or on a computer in communication with the server. Permissions could also be stored on client agents, e.g., while the attributes were in a secured part of the server or computer in communication with the server.

One or more client agents may be associated with any one or more clients. Permissions and/or attributes may be stored on the same client agent or different client agents. Each client may host permissions and/or attributes from a plurality of other clients on a server system. In another example, a particular client's permissions and/or attributes are hosted by a plurality of other clients. Permissions and/or attributes can be grouped, divided, or separated by any distinguishing feature and host on different clients to maintain separation.

Client agents may be workstations, mainframe computers, servers, mobile communication devices, or other computers having or connected to a storage medium. One or a plurality of client agents can be used to host permissions and/or attributes from any number of clients on a server system. Alternatively, a network of client agents supports clients based on location, content, etc. In a further embodiment, some or all clients are client agents, perhaps without being aware, as in the case of a workstation environment where each client stores permissions and/or attributes one or more local mediums.

Client agents may synchronize with the clients they serve, via the server, at periodic intervals, upon demand, in real time, or any combination or variation, thereof, as used for backing-up computer data. Permissions are generally date stamped. Attributes may also be date stamped.

Any or all client permissions and attributes may be stored on one or more client agents in an encrypted form, such that a client agent, while storing the permissions and/or attributes of one or more other clients, cannot access the content.

Examples of particular permissions and attributes are described below. Other embodiments will be apparent to the artisan.

A. Permission Sets

The permission sets controls what attribute sets a client 204, 206, 208 of the system 200 will share with other clients, what attribute sets a client will enable other client to query, whether other client will receive contact information of a client who matches a query request, and the content of query requests a querying client will receive.

Database for storing permissions settings, such as the data stores, may include tables for controlling access to attributes. Such tables typically include a user table, an access table, a privacy table, and a query access table.

The user table may include fields for user identification, user name, and other user information. The user table may include a number of attributes including, but not limited to, user name, anniversaries, home address, business address, home phone number, home fax number, cell phone number, business phone number, email addresses, wish lists, clothing sizes, favorite colors, favorite foods, and the like.

Exemplary methods for adding and/or editing the permissions or attributes are described with reference to FIG. 5 in U.S. patent application Ser. No. 11/397,817, which is incorporated herein by reference. In an illustrative embodiment, a subscriber adds or edits a set of permissions applicable to one or more other subscribers known to the subscriber as contacts. For example, a subscriber may add a new phone number and allow contacts in the subscriber's address book access to that phone number. The subscriber's address book may be stored in any format including those discussed herein. In another embodiment, a subscriber adds or edits the permissions associated with queries including, but not limited to, the subscriber's privacy status and/or query accessibility.

B. Attribute Sets

The attribute sets comprise entries having attributes associated with the clients of the system 200. The attributes may include, but are not limited to, first name, last name, anniversaries, home address, business address, home phone number, home fax number, cell phone number, business phone number, email addresses, wish lists, clothing sizes, favorite colors, favorite foods, and the like.

Attribute sets may or may not include a contact database, which stores information associated with a subscriber's contacts. The contact database may comprise a number of data entries wherein each entry includes one or more attributes associated with a contact known to the subscriber. A contact database entry may include additional attributes such as the type of contact including but not limited to a business or personal contact. Contact databases can be divided and stored on any number of clients.

Each attribute in the attribute sets may correspond to one or more permissions settings in the permission sets. A client may manipulate permissions in various configurations in order to restrict the distribution of attributes associated with the client. For example, a client may divide the attributes into categories such as personal and business and designate other subscribers known to the subscriber as a personal or business contact. Consequently, other clients designated as personal contacts are granted permissions to the personal attributes whereas the business contacts will have access only to the business attributes.

In one example, a client may set the permissions associated with an attribute such that one or more other a designated clients will be updated when the client changes the content or value of the attribute. Further, a client may set permissions to restrict what other clients will receive if the client's attributes match the query criteria. For example, the client may select a private status to receive notice of search queries matching the client's attributes and decide whether the querying parties will receive any result from the client.

C. Profile Database

The profile database 122 may include one or more attributes associated with a subscriber (referring to FIG. 1). For example, a profile database may comprise the subscriber's name, home address, e-mail address, favorite food, high school attended, and the like. In one embodiment, the profile database 122 may include permission control data associated with each profile attribute. Moreover, both the profile database and the contact database may be left unpopulated.

D. Access Tables

As described above, databases for storing permissions settings may include tables for controlling access to attributes. Such tables typically include an access table, a user table, a privacy table, and a query access table.

Access tables may include fields, such as grantor UID, attrib ID, and grantee UID. In one embodiment, a subscriber identified by a grantor UID grants a second subscriber identified by a grantee UID access to certain attributes identified by the attrib ID. For instance, a first subscriber identified by the grantor UID 000001 allows a second subscriber identified by grantee UID 000002 access to the first subscriber's attribute identified by attrib ID 000002. In one embodiment, if a grantor has granted a grantee access to certain attributes, the grantee has query access to those attributes. In another embodiment, if a grantor has granted a grantee access to certain attributes, the grantee receives updates of those attributes when the grantor makes any changes to the attributes. The attributes identified by the attrib ID may include personal, privileged, or other sensitive attribute data, e.g., as described herein.

III. Maintaining Secure and Current Permissions and Attributes

Maintaining the accuracy and integrity of data, including permissions and attributes, allows the system and methods to optimally protect and distribute/share client permissions and attributes.

In some embodiments, upon receiving a query from a querying client, a server contacts multiple client agents to obtain permissions and/or attributes. The server may then select the most recent permissions or attributes from among those stored by the client agent, e.g., using a time stamp placed on the relevant information. Time stamps are well known in the art.

Changing permissions and/or attributes may be associated with one or more security features such as, e.g., a one-time password, a confirmation number, a token, and the like. The server may check/verify such security features in selecting the permissions and/or attributes to apply.

Where unauthorized access to the server system or other tampering is suspected, the integrity and/or accuracy of the most recent permissions and attributes may be compromised, or assumed compromised. It may then be preferable to select permissions and/or attributes other than the most recent. In such cases, the server may select the permissions and/or attributes that predate the unauthorized access to, or suspected breach or vulnerability of, the system.

Where identical permissions and/or attributes are stored on multiple client agents, the server may select the permissions and/or attributes that are present on a plurality of client agents but ignores permissions and/or attributes present on one client agent, even if the latter set of permissions and/or attributes is more recent. In this manner, the system and methods verify permissions and prevent a client agent from changing a queried client's permissions and/or attributes, e.g., without consent.

Where different permissions and/or attributes are stored on different client agents, the server may apply any of the above or other selection criteria to each permission or attribute. For example, the server may select certain permission from a workstation or hand-held mobile device based on the most recent date stamp, while selecting other permissions or attributes predating an unauthorized access.

One skilled in the art will recognize that permissions and/or attributes may be selected by many criteria, with the general intent being the accuracy and security of data.

IV. Operational Embodiments

The exemplary operation embodiments may refer to one or more of the FIGs. but are not limited by them.

In one operational embodiment, where the server 302 in FIG. 3 (or client server as shown in FIG. 1) does not store a copy of a queried client's 306 permissions and/or attributes, they may be stored on one or more client agents, 308, 310, 312, i.e., a client that serves as an agent for another client. A querying client 304 may contact the server to request and attribute, such as a customer's contact information, from a second queried client 306. The particular attribute may be on the queried client's 306 local hard drive, where an email program stores user settings.

Upon finding that the queried client has logged-off his workstation or is other wise unavailable, the server forwards the request to one or more client agents 308, 310, 312 to obtain the most recent permissions for accessing the queried client's address book. The permissions may or may not be, by way of example but not limitation, date stamped. The querying client satisfies the most recent permissions and is allowed to access the address book, which may stored on the same client agent 308 or a different client agent 310, 312. The distribution/sharing of the attribute and identity of the querying client is reported to the queried client, e.g., via email, instant message, text message, etc.

In a second operational embodiment, a querying client 304 contacts the server to request an attribute, such as a customer's contact information, from a queried client 306. The attributes and permissions are on the queried client's 306 local hard drive, the permissions are also on a client agent 308. The queried client 306 workstation is suspected of unauthorized access.

Upon receiving a request for an attribute of a particular querying client 304, the server 302 checks permissions on the queried client's 306 workstation. The permissions were recently updated to allow this particular querying client to access this particular attribute. In response to the unauthorized access, the server 302 is configured to automatically contact a client agent to confirm permissions when a request is made to this queried client. The server 302 contacts the client agent 308 storing the queried clients permissions, which predate the unauthorized access. This particular querying client 304 is not permitted access to the attribute based on the earlier permissions, which the server recognizes as more reliable. The server does not allow access to the attribute.

The request by the querying client is reported to the queried client, log information is sent to the server, and the system administrator is alerted to the suspicious activity.

In a third operational embodiment, a queried client's 304 local hard drive crashes, causing the loss of important attributes that the queried client neglected to back-up. According to the present system, one or more client agent 306, 310, 312 stores the queried client's 304 information, enabling the queried client to recover the attributes.

In a fourth operational embodiment, a queried client's 304 local hard drive crashes, causing the loss of important attributes, such as address, website links, and account information. These attributes may have been backed-up during the server systems period back-up routine; however, this is Friday evening and IT personnel are unavailable. The present system and methods forwards the request to one or more client agents 306, 310, 312, which store the queried client's 304 information. Via permissions, the queried client is enable to recover the attributes and the queried client, as well as other querying clients, continue to have access to the attributes.

These operation examples illustrate use of the present system but are not intended as limiting. Many further uses will be apparent to one skilled in the art.

V. Exemplary Features of Further Illustrative Embodiments

A. Servers

The system generally includes a server to which the clients are connected. In some embodiments, the server 102 (FIG. 1) comprises one or more computer-readable mediums (which includes a medium used by any type of storage device that is accessible by a processor). The server 102 may include various hardware and/or software components, as described herein. The network 104 may be the internet, an intranet, or any other network, as described herein or known in the art.

The server may also be part of a distributed computing environment, wherein tasks are performed by remote processing devices linked through a communications network. The server may be coupled to one or more data stores, which may be internal to, directly connected to, and/or a part of the server. In some embodiment, the data stores may be separate or remote from the server and may communicate to the server through a network such as the network 104 illustrated in FIG. 1. The data stores comprise one or more computer-readable mediums, as described above. In one embodiment, the data stores may comprise an SQL database that stores subscriber information, attribute sets, permission sets, and a transactions log for the system.

Permissions may reside on the server, the server along with a the client, the server along with one or more client agent, or permutations and combinations, thereof. As used herein, attributes generally reside on storage medium separated from the server.

B. Client Servers

Client servers are common in large server-based network systems, where it is often desirable to distribute server functions among several server devices, which maintaining some level of centralized control. The client server 110 (FIG. 1) may include various hardware and/or software components, as with any server. In some embodiments, the clients 106 include a user interface 112, a contact database 120, and a user profile database 122. The user interface 112 facilitates the interaction between the system and a subscriber of the system. The subscriber may use the interface 112 to update profile attributes or contact information. The user interfaces may include, but is not limited to, an internet/web interface, a mobile phone and the like. As noted elsewhere, features described with reference to any one of the clients 106, 110 may be applicable to all or a subset of the clients 106, 110.

C. Mobile Devices

The server 202 may communicate with handheld devices, multiprocessor systems, microprocessor-based or programmable consumer electronics, network PCs, minicomputers, mainframe computers, wireless devices, and the like. One or more permissions and/or attributes may be stored on such devices. One or more permissions and/or attributes may be also be requested from such devices.

The mobile devices 108 may include various hardware and/or software components, as described herein. In many embodiments, clients 106 may be mobile devices. The 108 synch with the client 110 in a manner that is known in the computer arts. For example, the mobile device 108-1 may be by way of example but not limitation a mobile phone, and the mobile device 108-2 may be by way of example but not limitation a PDA, both of which can synch with, by way of example but not limitation, a Mac OS X Address book on a user's computer (e.g., the client 110) through an iSync mechanism, which is known in the computer arts. The client 110 would then update local databases based upon the results of the iSync. Comparable technologies exist for various address book types and various operating systems, including but not limited to Blackberry and Palm.

An exhaustive list of all combinations and permutations of embodiments has not been attempted here but one skilled in the relevant arts will recognize alternative embodiments based on those methods described herein.

Some portions of the detailed description may relate to the use of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or, advantageously, it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Where present, algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

While this invention has been described by way of example in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A distributed client computer system comprising:
   a first client capable of requesting one or more attributes associated with an unavailable second client;
   a plurality of client agents storing at least one or more attributes of the second client; and
   a server for receiving the first client's request, the server having a permissions database for storing a data entry specifying attribute-sharing permissions between the first client and the second unavailable client;
   wherein, in operation, the server forwards the request to the plurality of agent clients for the one or more attributes associated with the second client and the first client receives the at least one or more attributes from the plurality of agent clients.

2. The system of claim 1, wherein the permissions database further comprises attribute-sharing permission data entries between the one or more agent clients and the second client.

3. The system of claim 1, wherein each of the one or more agent clients include a database for storing one or more attributes associated with one or more clients with which the client agent shares attributes.

4. The system of claim 1, wherein the second client is logged off.

5. The system of claim 1, wherein the second client is powered-off.

6. The system of claim 1, wherein the permissions database is distributed among one or more clients.

7. A computer-implemented method, comprising:
   receiving a query from a first client for one or more attributes associated with a second client;
   if the first client has permission to access at least one of the one or more attributes associated with the second client, querying plurality of agent clients storing data associated with the at least one of the one or more attributes; and
   receiving by the first client, the at least one of the one or more attributes from the plurality of agent clients.

8. The method of claim 7, further comprising:
receiving the at least one of the one or more attributes from the agent client;
forwarding the at least one of the one or more attributes to the first client.

9. The method of claim 7, further comprising looking up an attribute-sharing permissions database for an entry associated with the first client and the second client.

10. The method of claim 7, further comprising forwarding the response to the first client if the first client has permission to receive data associated with the at least one of the one or more attributes.

11. The method of claim 7, further comprising forwarding a first reply from one of the plurality of client agents to the first client.

12. The method of claim 7, further comprising:
receiving a plurality of responses from the plurality of agent clients;
comparing the plurality of responses for verification.

13. The method of claim 7, further comprising looking up an attribute-sharing permissions database for agent clients that share the one or more attributes associated with the second client.

* * * * *